(12) United States Patent
Kamikubo (10) Patent No.: US 6,212,022 B1
(45) Date of Patent: Apr. 3, 2001

(54) BEAM SHAPING OPTICAL SYSTEM

(75) Inventor: Junji Kamikubo, Tokyo (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/629,142

(22) Filed: Jul. 31, 2000

Related U.S. Application Data (62) Division of application No. 09/005,038, filed on Jan. 9, 1998, now Pat. No. 6,128,119.

(30) Foreign Application Priority Data

Jan. 10, 1997 (JP) .......................................................... 9-14484
Jan. 10, 1997 (JP) .......................................................... 9-14485

(51) Int. Cl.$^7$ ................................................................. G02B 5/04
(52) U.S. Cl. ............................................... 359/837; 359/831
(58) Field of Search ................................... 359/831, 837, 359/668, 669, 211

(56) References Cited

U.S. PATENT DOCUMENTS

| | | |
|---|---|---|
| 4,768,184 * | 8/1988 | Reno ..................................... 359/211 |
| 4,770,507 * | 9/1988 | Arimoto et al. ..................... 359/211 |
| 4,872,747 | 10/1989 | Jalkio et al. . |
| 4,904,068 | 2/1990 | Tatsuno et al. . |
| 5,130,840 | 7/1992 | Iima et al. . |
| 5,189,546 | 2/1993 | Iizuka . |
| 5,194,981 | 3/1993 | Morimoto . |
| 5,208,456 | 5/1993 | Appel et al. . |
| 5,604,622 | 2/1997 | Iizuka et al. . |
| 5,610,647 | 3/1997 | Takada . |
| 6,038,089 | 3/2000 | Maruyama et al. . |

* cited by examiner

Primary Examiner—James Phan
(74) Attorney, Agent, or Firm—Greenblum & Bernstein, P.L.C.

(57) ABSTRACT

Disclosed is a multi-beam optical system, which has a light source having a plurality of light emitting portions from which a plurality of light beams are emitted, respectively; a collimating lens which collimates the plurality of light beams into a plurality of parallel light beams; a beam shaping optical system including at least one wedge prism, the beam shaping optical system shaping cross section of the plurality of parallel beams; an image forming optical system which converges the plurality of parallel beams transmitted through the beam shaping optical system. In such a multi-beam optical system, a plurality of light emitting portions are aligned in a direction perpendicular to a principal section of the wedge prism.

3 Claims, 9 Drawing Sheets

FIG. 8A  fθ error (linearity error)

FIG. 8B  curvature of field

--- main scanning section
— auxiliary scanning section

FIG. 8C  curvature of scanning line

BEAM SHAPING OPTICAL SYSTEM

CROSS-REFERENCE TO RELATED APPLICATIONS

This application is a division of U.S. Patent application Ser. No. 09/005,038, filed Jan. 9, 1998, U.S. Pat. No. 6,128,119, the contents of which are expressly incorporated by reference in its entirety.

BACKGROUND OF THE INVENTION

The present invention relates to a beam shaping optical system that affects a cross-sectional shape of a light beam, and a multi-beam optical system employing the beam shaping optical system.

A laser diode emits a beam having an elliptical-shaped far-field pattern. To convert the elliptical-shaped light beam to a beam having a circular cross section, conventionally, a beam shaping optical system has been used. The conventional beam shaping optical system is provided with a single or a pair of wedge prisms, which are aligned such that a principal section thereof is in parallel with a direction of a semiminor axis of the elliptical-shape of the beam. It should be noted that the principal section of a wedge prism is defined as a plane perpendicular to both of the two refractive surfaces thereof through which a light beam passes. By the above arrangement, the semiminor axis of the elliptical beam is magnified by the wedge prism to have substantially the same length of the semimajor axis thereof.

This type of beam shaping optical system is generally included in an optical system of a laser beam printer or the like in order to control light output by a light source such as a laser diode effectively to form a symmetrical beam spot on an object surface.

Further, in order to increase the scanning efficiency of such devices (laser beam printers and the like), a plurality of light beams may be simultaneously used to read or write information. In such a case, a multi-beam laser diode is generally used as a light source. A multi-beam laser diode includes a plurality of light emitting points arranged in a single element.

However, if the conventional beam shaping optical system which is designed for converting the cross-sectional shape of a single light beam is used for the multi-beam optical system, a problem arises in that, due to a variation in incident angles onto the wedge prism among the beams emitted from the multiple emitting points of the multi-beam laser diode and collimated by a collimating lens, intervals between the spots formed on the objective surface (i.e., a surface on which the spots are to be formed) cannot be maintained constant. Specifically, the light emitting points of the multi-beam laser diode are aligned in a direction in parallel with the semiminor axes of the elliptical shape of the emitted beams. Therefore, in order to magnify the semiminor axis of the elliptical cross section of each beam, it is preferable that the light emitting points of the multi-beam laser diode are aligned in a direction parallel to the principal section of the wedge prism. However, since an angular magnification by the beam shaping optical system in the principal section varies depending on the incident angle of an incident beam, emitting angles of the plurality of beams are different from incident angles thereof. Therefore, when the conventional beam shaping optical system is used for a multi-beam optical system employing a multi-beam laser diode, beam spots formed on the objective surface may be positioned at irregular intervals even if the emitting points of the light beams are positioned at predetermined regular intervals.

SUMMARY OF THE INVENTION

It is therefore an object of the present invention to provide an improved beam shaping optical system with which elliptical-shaped light beams emitted from light emitting points aligned at regular intervals are converted to circular-shaped light beams which are aligned at regular intervals.

According to an aspect of the invention, there is provided a multi-beam optical system, comprising: a light source having a plurality of light emitting portions from which a plurality of light beams are emitted, respectively; a collimating lens which collimates the plurality of light beams into a plurality of parallel light beams; a beam shaping optical system including at least one wedge prism, the beam shaping optical system shaping cross section of the plurality of parallel beams; an image forming optical system which converges the plurality of parallel beams transmitted through the beam shaping optical system, wherein the plurality of light emitting portions are aligned in a direction perpendicular to a principal section of the wedge prism.

Since the plurality of light emitting portions are aligned in a direction perpendicular to the principal section of the wedge prism, the wedge prism functions as a parallel plate in the direction in which the light emitting portions are aligned, if the angle between each adjacent beams are even, the spots formed on the objective surface have regular intervals.

Optionally, each of the plurality of light emitting portions may emit an elliptical light beam which has an elliptical cross section having a semimajor axis and semiminor axis, and the plurality of light emitting portions can be aligned in a direction where the semiminor axis extends.

Further, the light source comprises a multi-beam laser diode having the plurality of light emitting portions aligned in a direction parallel to an active layer of the laser diode.

Furthermore, the beam shaping optical system comprises a first and a second wedge prisms, a principal section of the first wedge prism and a principal section of the second wedge prism are parallel to each other.

Still optionally, when a reference ray is incident on the first wedge prism and a skew ray, which has a same incident angle as the reference ray if projected on the principal section and inclined by an angle V with respect to the reference ray in a plane perpendicular to the principal section, a condition:

$$|\theta 8 - \theta' 8| < 0.100°$$

is satisfied,
where, $\theta 8$ is an emission angle of the reference ray emitted from the second wedge prism in the principal section, and $\theta' 8$ is an emission angle of the skew ray emitted from the second wedge prism projected on the principal section, and $|V| < 10°$.

Further, the image forming optical system may include a deflector which deflects the plurality of light beams emerged from the beam shaping optical system, and a scanning lens which converges the plurality of light beams deflected by the deflector, and the plurality of light emitting portions may be arranged such that a plurality of spots formed on a surface to be scanned are apart from each other in an auxiliary scanning direction.

According to another aspect of the invention, there is provided a beam shaping optical system, comprising a first and a second wedge prism, principal sections of the first and second wedge prisms being parallel with each other, wherein when a reference ray is incident on the first wedge prism and a skew ray, which has a same incident angle as the reference ray if projected on the principal section and inclined by an angle V with respect to the reference ray in a plane perpendicular to the principal section, a condition:

$$|\theta 8 - \theta'8| < 0.100°$$

is satisfied,
where, θ8 is an emission angle of the reference ray emitted from the second wedge prism in the principal section, and θ"8 is an emission angle of the skew ray emitted from the second wedge prism projected on the principal section, and |V|<10°.

Optionally, an incident angle of the reference ray onto the first prism may be zero degree.

Further, it is preferable that an anamorphic ratio Mv/Mh satisfies a condition:

$$1.00 < Mv/Mh < 3.00$$

where, Mv is a magnification (i.e., a diameter of an emitted beam/a diameter of an incident beam) of the beam shaping optical system within a plane perpendicular to the principal section, and Mh is a magnification (i.e., a diameter of an emitted beam/a diameter of an incident beam) of the beam shaping optical system in a plane perpendicular to the principal section.

BRIEF DESCRIPTION OF THE DRAWINGS

FIGS. 4A–4C show lens diagrams of the scanning optical system, where

FIGS. 8A–8C show lens diagrams of the scanning optical system, where

DETAILED DESCRIPTION OF THE PREFERRED EMBODIMENTS

Initially, scanning optical systems according to a first and a second embodiments of the invention will be described. The scanning optical systems are multi-beam optical systems in which five beams are scanned simultaneously.

Figure 1:
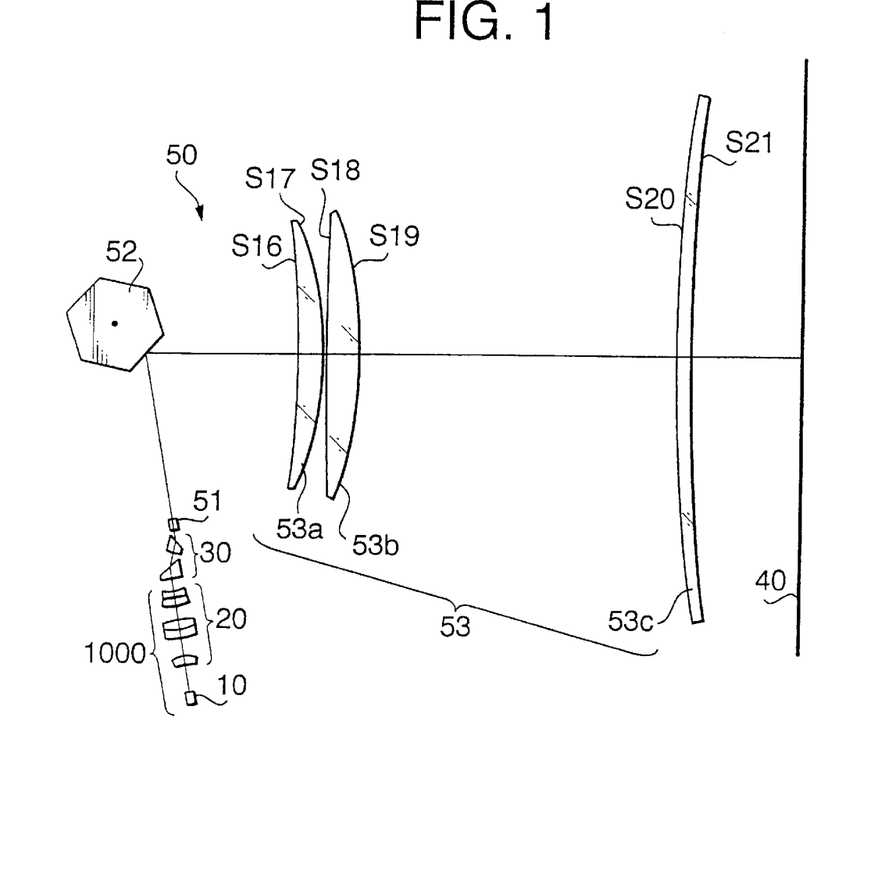
FIG. 1 shows a scanning optical system according to a first embodiment of the invention.

FIG. 1 shows a first optical scanning system 100 according to a first embodiment of the invention. The optical scanning system 100 has a light source unit 100 which includes a multi-beam laser diode 10, and a collimating lens 20 which collimates beams emitted by the laser diode 10 to parallel beams. The optical scanning unit further comprises a beam shaping optical system 30 consisting of a pair of (a first and a second) wedge prisms 31 and 32 which convert cross sectional shapes of beams passed through the collimating lens 20 from an elliptical shape to a circular shape, and a converging optical system 50 which converges the shaped beams on a surface 40 to be scanned.

The converging optical system 50 includes a cylindrical lens 51, a polygon mirror 52 which deflects beams incident thereon, and fθ lens 53 which forms a plurality of spots scanning on the surface 40 at a constant speed.

Figure 11:
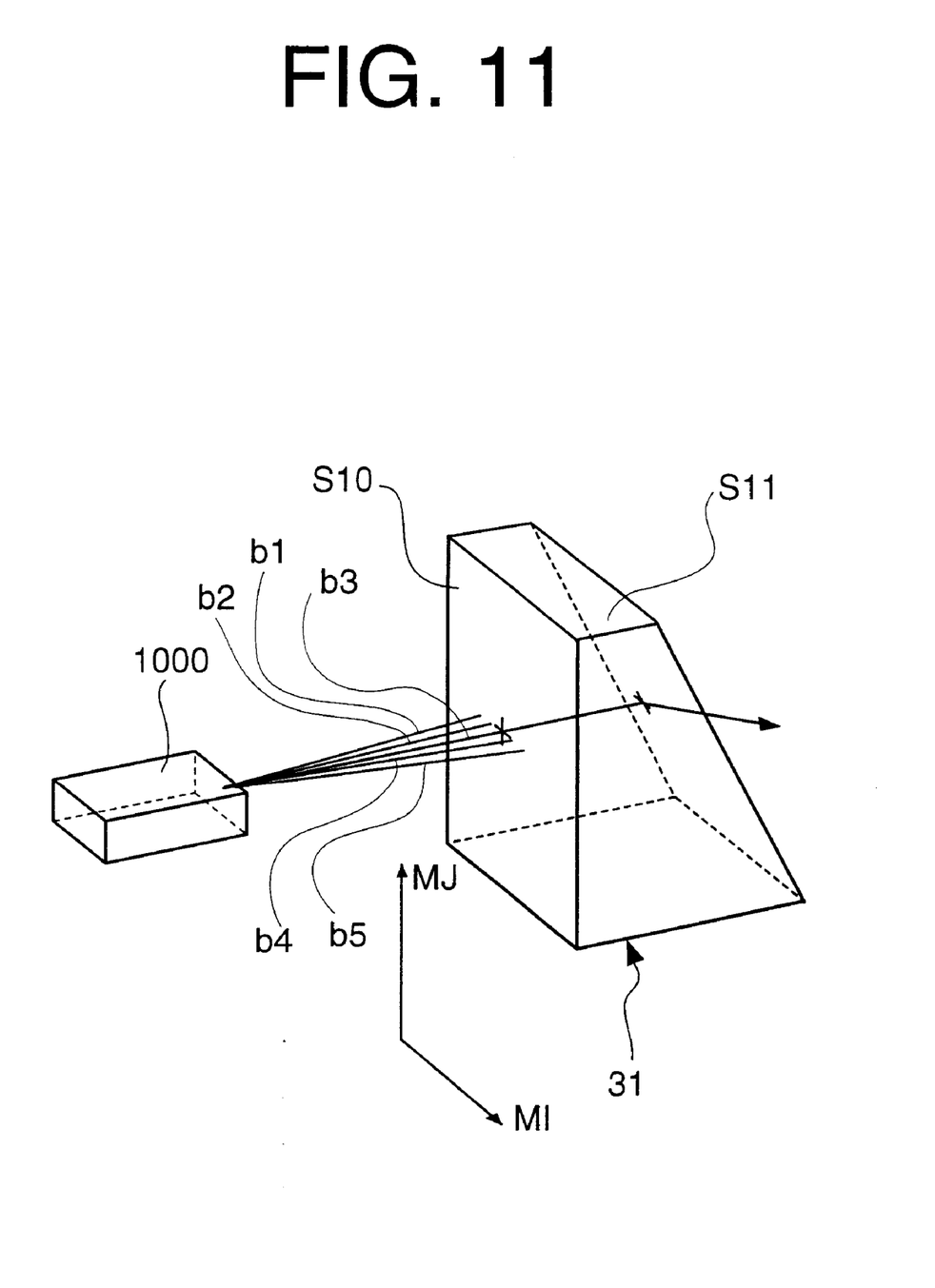
FIG. 11 schematically shows a light source unit from which a plurality of rays are incident onto a prism

Each beam emitted by the laser diode 10 is a diverging light and has an elliptical far-field pattern having a semiminor axis in a direction parallel to an active layer (i.e., a p-n junction surface of the laser diode 10), and a semimajor axis in a direction perpendicular to the active layer. In this example, the laser diode 10 has five beam emitting points which are aligned along a direction parallel to the semiminor axis. Beam emitting directions of the beams, i.e., the central axes of the beams emitted by the laser diode 10 are parallel with each other. However, after collimated by the collimating lens, directions in which the central axes of the beams extend are slightly different from each other. That is, the five beams b1–b5 are emitted from the light source unit 1000 as shown in FIG. 11. In FIG. 11, a direction of the semiminor axes of the beams b1–b5 is indicated by arrow MI, and a direction of the semimajor axes of the beams b1–b5 are indicated by arrow MJ. Hereinafter, the central axis of the center beam of the five beams will be referred to as a reference ray (indicated as b3 in FIG. 11). The optical scanning system is arranged such that the reference ray b1 coincides with the optical axis of the collimating lens 20. In this specification, a plane including the reference ray b1 incident on the polygon mirror 52 and deflected thereby is referred to as a main scanning plane. The main scanning plane also includes the optical axis of the collimating lens 20, and the fθ lens 53. Further, a direction perpendicular to the optical axis of the fθ lens 53 and in parallel with the main scanning plane will be referred to as a main scanning direction, and a direction perpendicular to both the optical axis of the fθ lens 53 and the main scanning plane will be referred to as a auxiliary scanning direction.

The multi-beam laser diode 10 is arranged such that the active layer thereof is aligned in a direction parallel to the auxiliary scanning direction. Accordingly, the beam emitting points are aligned in the auxiliary scanning direction, and a plurality of spots formed on the surface 40 are apart from each other in the auxiliary scanning direction. In FIG. 1 or in FIG. 2, the active layer is perpendicular to a surface of the drawing. Therefore, each of the beams passed through the collimating lens 20 has an elliptical shape having a semiminor axis extending in the direction parallel to the active layer, and a semimajor axis extending in the direction perpendicular to the semiminor axis. Thus, the five elliptical-shaped beams are aligned such that the semimajor axes thereof extend in the same direction, and the five beams are aligned along the direction of the semiminor axes thereof (see FIG. 11). Furthermore, through the collimating lens 20, each beam is directed, as a parallel beam, towards the beam shaping optical system 30 at a predetermined angle with respect to the reference ray. It should be noted that the each of the beams b1–b5 is a parallel beam, but the beams b1–b5 are not parallel with each other.

The prisms 31 and 32 are arranged such that the principal sections thereof are parallel with the main scanning plane.

Figure 2:
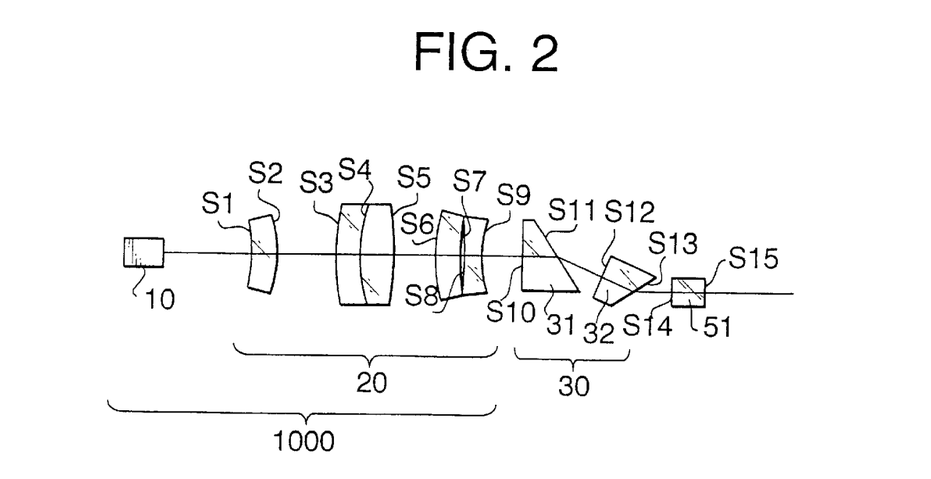
FIG. 2 is an enlarged view of a light source portion of the scanning optical system shown in FIG. 1.

The beam shaping optical system 30 reduces the diameters of the five beams along the semimajor axes thereof to convert the elliptical-shaped cross section to the circular-shaped cross sections Since the principal sections of the prisms 31 and 32 are in parallel with the reference ray, the other four beams are incident on the beam shaping optical system 40 as skew rays which are inclined with respect to the principal section. In FIGS. 1 and 2, the principal section of the prisms 31 and 32 is parallel with the surface of the drawings. In the first embodiment, the inclination of each refraction surface of the prisms 31 and 32 is determined such that the incident beams onto the beam shaping optical system 30 are in parallel with the beams emitted from the beam shaping optical system 30.

In this example, since the beam emitting points of the laser diode 10 are aligned in a direction perpendicular to the principal section of the prisms 31 and 32, the wedge prisms 31 and 32 of the beam shaping optical system 30 functions as a parallel plate having no angular magnification with respect to the direction in which the beam emitting points are aligned. Thus, if the angles between the beams are even, the spots formed on the objective surface 40 through the converging lens have even intervals.

The cylindrical lens 51 has a power only in the auxiliary scanning direction, and forms a linearly extending image, which extends in the main scanning direction, on a plane closely adjacent to a reflection surface of the polygon mirror 52. The fθ lens 53 has a first and second lenses 53a and 53b each of which has a positive power in the main and auxiliary scanning directions, a third lens 53c which has a substantially no power in the main scanning direction and a relatively strong positive power in the auxiliary scanning direction.

A numeral structure of the scanning optical system 100 described above will be explained hereinafter. The multi-beam laser diode 10 has five beam emitting points which are aligned at an interval of 50 μm. Wavelength of the emitting beam is 780 nm. In the description below, a surface of the collimating lens 20 on the laser diode 10 side is referred to as a first surface (S1), and the surface number is assigned to each surface from the first surface in order. In the tables, the numerical structure of the collimating lens 20, the beams shaping prisms 31 and 32, the cylindrical lens 51, and the fθ lens 53. In the tables, "r" represents a radius (unit: mm) of curvature of each surface which is a rotation-symmetrical surface, "d" represents a distance (unit: mm) between two adjacent surfaces, "n" represents a refractive index at the wavelength of 780 nm. In the tables, a cylindrical surface and a toric surface are expressed by a radius "rz" in the main scanning direction, and a radius "rz" in the auxiliary scanning direction. Note that for rotational-synmetrical surfaces, only "ry" is indicated since ry=rz.

As shown in TABLE 1, the collimating lens 20 includes four groups with five lens elements and has nine surfaces, i.e., the first surface S1 through the ninth surface S9. A focal length of the collimating lens 20 is indicated as "fc", and a distance between the beam emitting points of the laser diode 10 and the first surface S1 of the collimating lens 20 is indicated by "d0".

TABLE 1

| surface # | r | d | n |
|---|---|---|---|
| | fc = 8.99 mm d0 = 13.605 | | |
| 1 | −27.851 | 3.200 | 1.86888 |
| 2 | −14.284 | 7.000 | |
| 3 | 37.034 | 3.000 | 1.82484 |
| 4 | 25.248 | 4.000 | 1.82195 |
| 5 | −37.278 | 5.000 | |
| 6 | 19.048 | 3.000 | 1.82195 |
| 7 | 116.856 | 0.500 | |
| 8 | −46.765 | 2.000 | 1.82484 |
| 9 | | 15.000 | |

Figure 3:
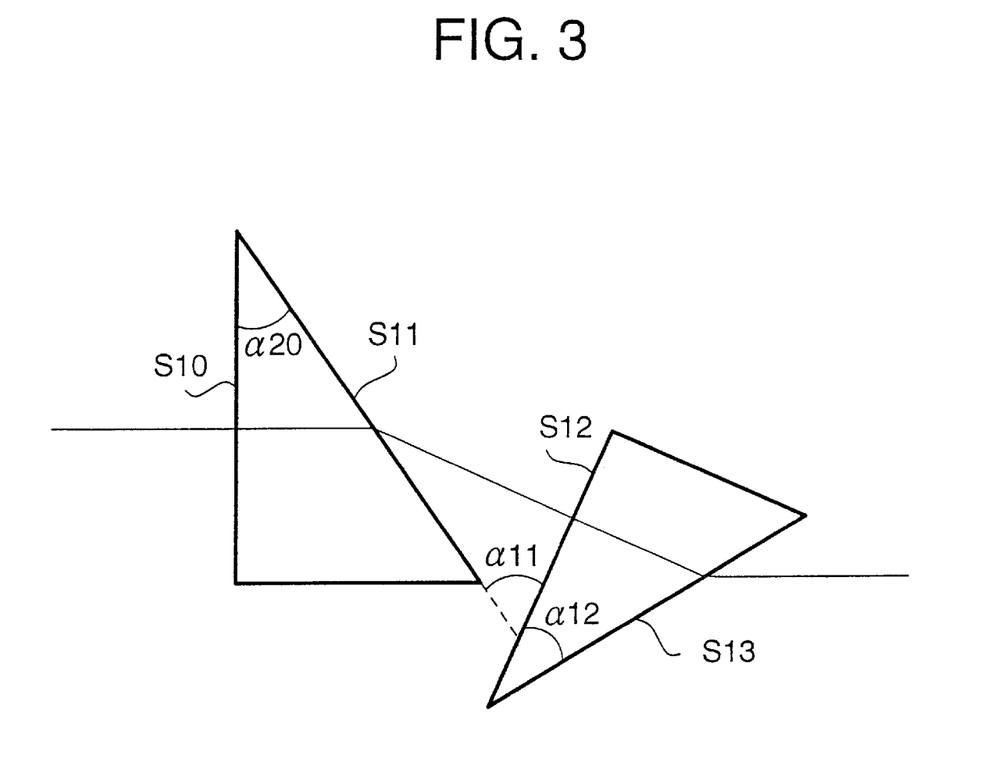
FIG. 3 is an enlarged view of a beam shaping optical system of the scanning optical system shown in FIG. 1.

The beam shaping optical system 30 consists of the first prism 31 having a tenth surface S10 and an eleventh surface S11, and the second prism 32 having a twelfth surface S12 and a thirteenth surface S13. Since each surface of the prisms 31 and 32 is a flat surface, a value of the radius "r" of each surface is ∞. A character "α" represents an angle between adjacent two surfaces of the prism. The angle "α" is an acute angle formed between two surfaces, measured with respect to a surface on the laser diode side, in a clockwise direction in FIG. 3. That is, when the sign of the angle "α" is positive, the angle is measured in the clockwise direction, and if the sign is negative, in the counterclockwise direction. The distance "d" between surfaces is a length of the reference ray between the adjacent two surfaces. "d9" is a distance between the last surface (i.e., the ninth surface S9) of the collimating lens 20 and the light source side surface (i.e., the tenth surface S10) of the first prism 31.

TABLE 2

| surface # | r | d | n | α |
|---|---|---|---|---|
| | d9 = 5.000 mm | | | |
| 10 | ∞ | 4.000 | 1.51072 | −34.374 |
| 11 | ∞ | 6.000 | | 24.159 |
| 12 | ∞ | 4.000 | 1.51072 | 34.374 |
| 13 | ∞ | | | |

The numerical structure of the cylindrical lens 51 is indicated below, in TABLE 3. In TABLE 3, "d13" represents a distance between the light emerging surface of the second prism 32 (i.e., the thirteenth surface, S13) and the light receiving surface (i.e., the fourteenth surface, S14) of the cylindrical lens 41, along the reference ray.

TABLE 3

| surface # | ry | rz | d | n |
|---|---|---|---|---|
| | d13 = 5.000 | | | |
| 14 | ∞ | 30.000 | 4.000 | 1.51072 |
| 15 | ∞ | | | |

A distance between a light emitting side surface (a fifteenth surface, S15) of the cylindrical lens 51 and a deflection point of the polygon mirror 52 is 66.400 mm, a distance between the deflection point to a light incident side surface (i.e., a sixteenth surface, S16) of the first lens 53a of the fθ lens 53 is 61.210 mm, and an angle formed between the reference ray incident on the polygon mirror 52 and the optical axis of the fθ lens 53 is 80 degrees. The numerical structure of the fθ lens 53 is as indicated in TABLE 4. A twentieth surface S20, which is a polygon mirror side surface of the third lens, is a toric surface having a relatively strong positive power in the auxiliary scanning direction, and has a rotation axis extending in the auxiliary scanning direction. The other surfaces are all spherical surfaces. A focal length of the fθ lens 53 in the main scanning plane is expressed as "fm", and "W" represents a scanning width on the surface 40 to be scanned, and "ω" is a field angle corresponding to the scanning width.

TABLE 4

| fm = 180.0 mm W = 216.0 mm ω = 34.4 deg. | | | | |
|---|---|---|---|---|
| surface # | ry | rz | d | n |
| 16 | −364.477 | — | 9.280 | 1.48479 |
| 17 | −128.234 | — | 2.000 | |
| 18 | 1341.631 | — | 12.250 | 1.48479 |
| 19 | −17.937 | — | 126.810 | |
| 20 | 704.054 | 20.222 | 5.000 | 1.48479 |
| 21 | 785.086 | | 46.160 | |

Figure 4A:
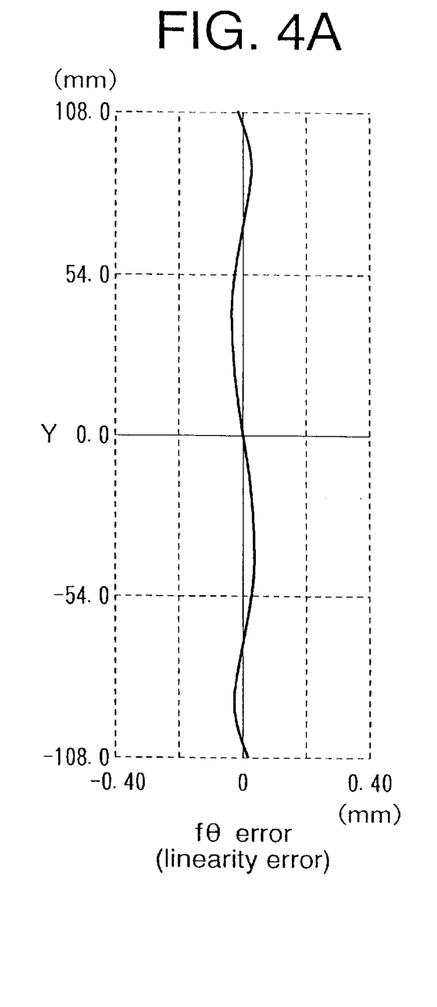
FIG. 4A shows a linearity error.
Figure 4B:
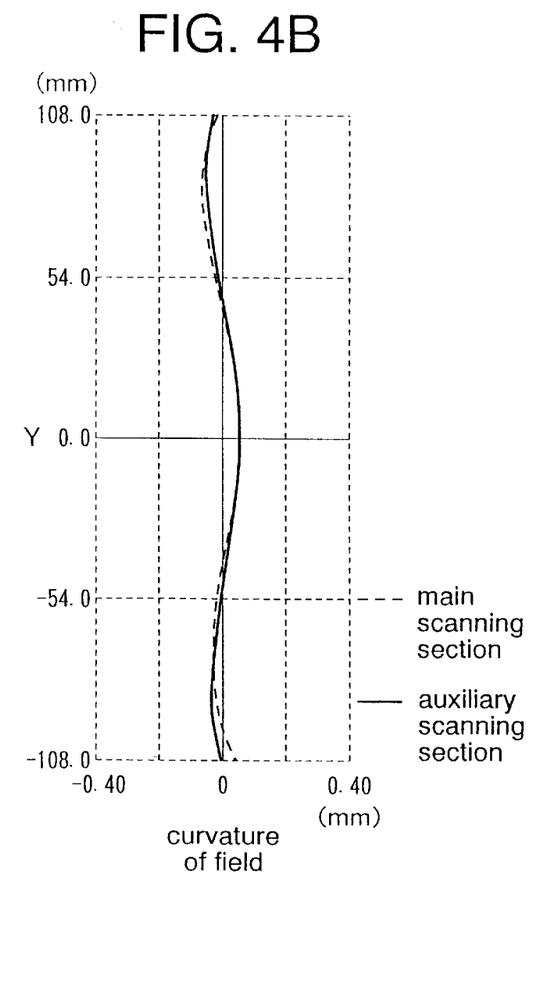
FIG. 4B shows a curvature of field.
Figure 4C:
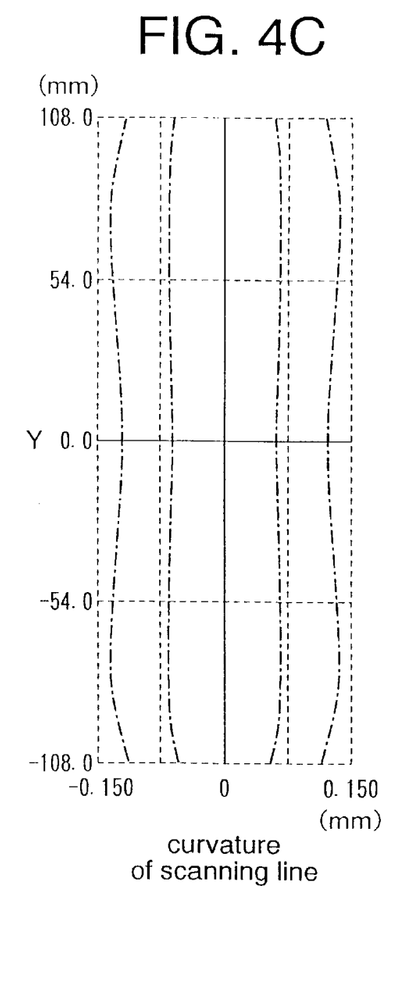
FIG. 4C shows a curvature of a scanning line.

FIGS. 4A–4C show graphs of the scanning optical system, where FIG. 4A shows a linearity error, FIG. 4B shows a curvature of field (broken line: main scanning section; solid line: auxiliary scanning section), and FIG. 4C shows a curvature, in the auxiliary scanning direction, of a scanning line. In each graph, a vertical axis represents an image height Y (i.e., a coordinate in the main scanning direction with respect to an origin at which the optical axis of the fθ lens 53 intersects the surface 40), and a horizontal axis represents amount of each aberration. Unit of measurement is mm (millimeter).

TABLE 5 below indicates a positoinal relationship between spots which are formed on the surface 40. In TABLE 5, ΔZ0 represents a coordinate of light emitting point on the multi-beam laser diode 10, with respect to the third beam emitting point from which the reference ray is emitted. ΔZ1 represents a coordinate, in the auxiliary scanning direction, of a center of each spot formed on the surface 40 with respect to the point where the reference ray intersects the surface 40. ΔY1 represents position, in the main scanning direction, of the center of each spot on the surface 40 with respect to a position where the reference ray intersects the surface 40. Unit of measurement for ΔZ0, ΔZ1, and ΔY1 is μm (micrometer).

TABLE 5

| | ΔZ0 | ΔZ1 | ΔY1 |
|---|---|---|---|
| 1st emitting point | 100 | 123 | 2 |
| 2nd emitting point | 50 | 61 | 1 |
| 3rd emitting point | 0 | 0 | 0 |
| 4th emitting point | −50 | −61 | 1 |
| 5th emitting point | −100 | −123 | 2 |

As indicated in TABLE 5, in the auxiliary scanning direction, the angular magnification of the beam shaping optical system 30 does not affects the position of the spots. Accordingly, if the beams are emitted from the points having even intervals, the spots formed on the surface 40 also have even intervals in the auxiliary scanning direction. Note that, in the first embodiment, the spots are not aligned in the main scanning direction. Therefore, if the structure according to the first embodiment is employed, the multi-beam laser diode 10 should be controlled to emits the beams at different timings so that the variation, in the main scanning direction, of the spots can be compensated.

As described above, when a plurality of beams are aligned in a direction perpendicular to the principal section of a prism, the beams which is incident on the prism as skew rays result in the spots, on a surface to be scanned, shifted in the main scanning direction. In order to cancel the shift in the main scanning direction, the beam shaping optical system 30 should satisfy the following condition.

That is, when the incident angle of the reference ray incident on the first prism 31 along the principal section is the same as an incident angle, projected on the principal section, of a skew ray, the skew ray and the reference ray forms an angle V in a plane perpendicular to the principal section, and an emitting angle of the reference ray emitted from the second prism 32 is θ8, and an emitting angle, projected on the principal section, of the skew ray emitted from the second prism 32 is θ'8'8, the following equation (1):

$$|θ8-θ'8'8|<0.100°  \quad (1)$$

is satisfied for $|V|<10°$

When projected on the principal section, the skew ray is incident on the first prism 31 at the same incident angle of the reference ray. However, in the plane perpendicular to the principal section, since the incident angle of the reference ray is 0°, the skew ray has greater incident angle.

If a refraction surface of the prism is perpendicular to a plane including the reference ray and the skew ray, i.e., when the incident angle of the reference ray is 0°, incidence planes of the skew ray and the reference ray coincide, and the difference of the incident angles therebetween does not appear when each ray is projected on the principal section. It should be noted that the incidence plane is a plane including an incident ray and a normal to the surface on which the ray is incident, and accordingly, the incidence plane is defined for each ray, and the ray refracts within the incidence plane. Further, the incidence plane of the reference ray is parallel with the principal section.

If the refraction surface of the prism is not perpendicular to a plane including the reference ray and the skew rays incident thereon, the incidence plane of the skew ray inclines with respect to the principal section. In this condition, if the ray which refracts within the plane of incidence of the skew ray is projected on the principal section, the ray looks to refract as if the refractive index is different from it actually is. This apparent refractive index ns when the skew ray is projected on the principal section is expressed by the equation (2) below.

$$ns = \frac{\sqrt{n^2 - \sin^2 V}}{\cos V} = \sqrt{n^2 + (n^2 - 1) \times \tan^2 V} \quad (2)$$

where, V is an angle formed between a skew ray and the reference ray on a plane perpendicular to the principal section; and n is a refractive index of a prism. The beam shaping optical system 30 is capable of suppressing a difference between an angle at which the reference ray is refracted and an angle at which the skew ray is refracted when projected on the principal section.

Figure 5:
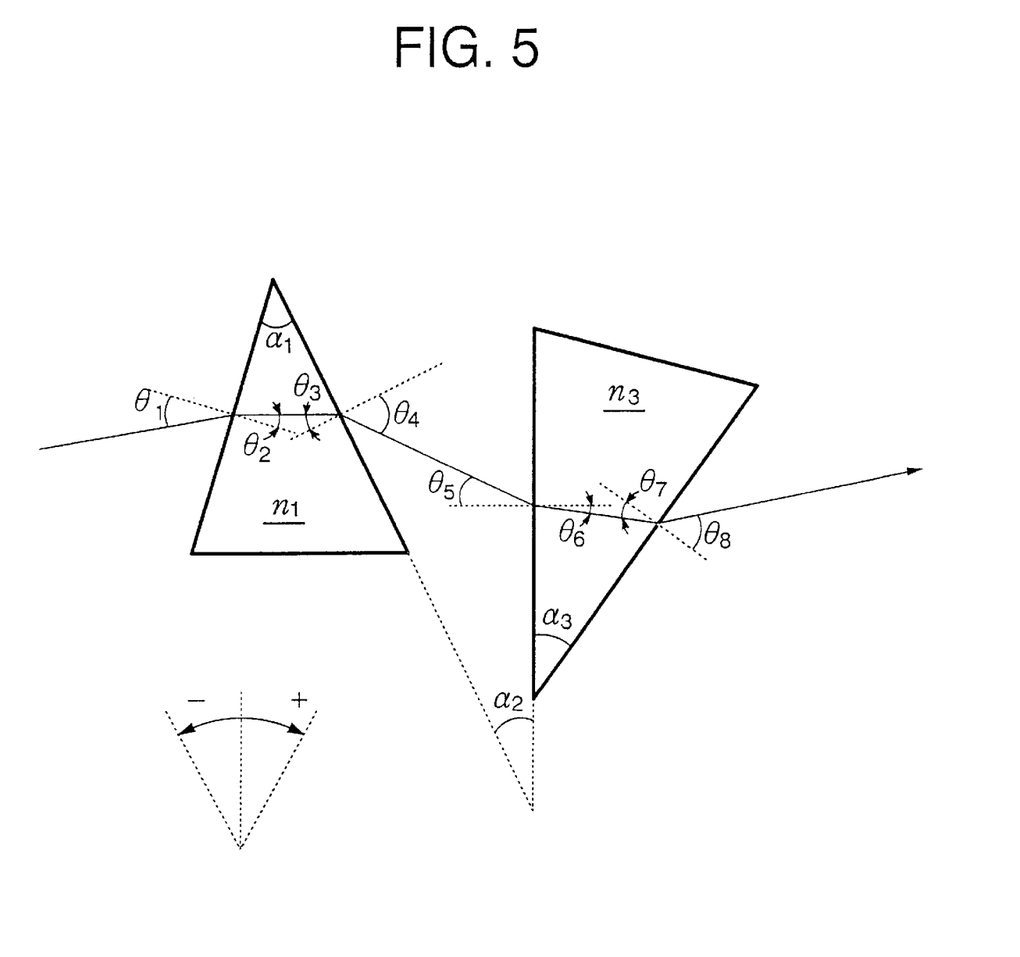
FIG. 5 shows definitions of variables used in calculating characteristics of a prism.

Next, a condition for suppressing the above-described angular difference at a relatively small value will be obtained by calculation. FIG. 5 shows definitions of variables used in the calculation.

Firstly, an optical path of the reference ray which proceeds within the principal section. In FIG. 5, θ1 is an incident angle of the reference ray to the first prism 31 within the principal section, θ2 is the refraction angle of the ray which is refracted at the first surface, θ3 is an incident angle onto the second surface, and θ4 is an emission angle with respect to the second surface. Similarly, an incident angle and refraction angle with respect to the first surface of the second prism, and an incident angle and emission angle with respect to the second surface of the second prism are defined as θ5, θ6, θ7, and θ8. The incident angle, refraction angle and the emission angle are angles with respect to a normal on a surface on which the ray intersects the surface, and has a positive value when measured in clockwise direction and a negative value when measured in counter-clockwise direction.

Based on the above definition, the emission angle θ8 is calculated as a function of prism angles (apex angles) α1, α3, refractive indexes n1, n3, and an angle α2 between the second surface of the first prism, the first surface of the second prism, and the incident angle θ1. If the calculated angle θ8 using the indexes n1 and n3 is substantially equal to an emission angle θ'8'8 calculated based on the apparent indexes ns1 and ns3 respectively obtained by substituting the indexes n1 and n3 in the equation (2), it becomes possible to suppress the angular difference between the reference ray and the skew ray projected on the principal section.

According to Snell's law, $$\sin θ8 = n3 \sin θ7$$

Therefore, $$θ8 = \sin^{-1}(n3 \sin θ7) \quad (3)$$

Similarly, θ6, θ4, θ2 are expressed as follows.

$$θ6 = \sin^{-1}\left(\frac{\sin θ5}{n3}\right) \quad (4)$$

$$θ4 = \sin^{-1}(n1 \sin θ3) \quad (5)$$

$$θ2 = \sin^{-1}\left(\frac{\sin θ1}{n1}\right) \quad (6)$$

In accordance with a geometric method, θ7, θ5 and θ3 are obtained from θ6, θ4 and θ2, respectively, as indicated below.

$$θ7 = -α3 + θ6 \quad (7)$$

$$θ5 = θ4 - α2 \quad (8)$$

$$θ3 = -α1 + θ2 \quad (9)$$

Based on the above expression, the emission angle θ8 of the reference ray is expressed as follows.

$$θ8 = \sin^{-1}\left[n3\sin\left(\sin^{-1}\left(\frac{\sin\left(\sin^{-1}\left(n1\sin\left(\sin^{-1}\left(\frac{\sin θ1}{n1}\right) - α1\right)\right) - α2\right)}{n3}\right) - α3\right)\right] \quad (10)$$

Similarly, the emission angle θ'8'8 of the skew ray on the principal section is expressed as follows.

$$θ8 = \sin^{-1}\left[ns3\sin\left(\sin^{-1}\left(\frac{\sin\left(\sin^{-1}\left(ns1\sin\left(\sin^{-1}\left(\frac{\sin θ1}{ns1}\right) - α1\right)\right) - α2\right)}{ns3}\right) - α3\right)\right] \quad (11)$$

Figure 6:
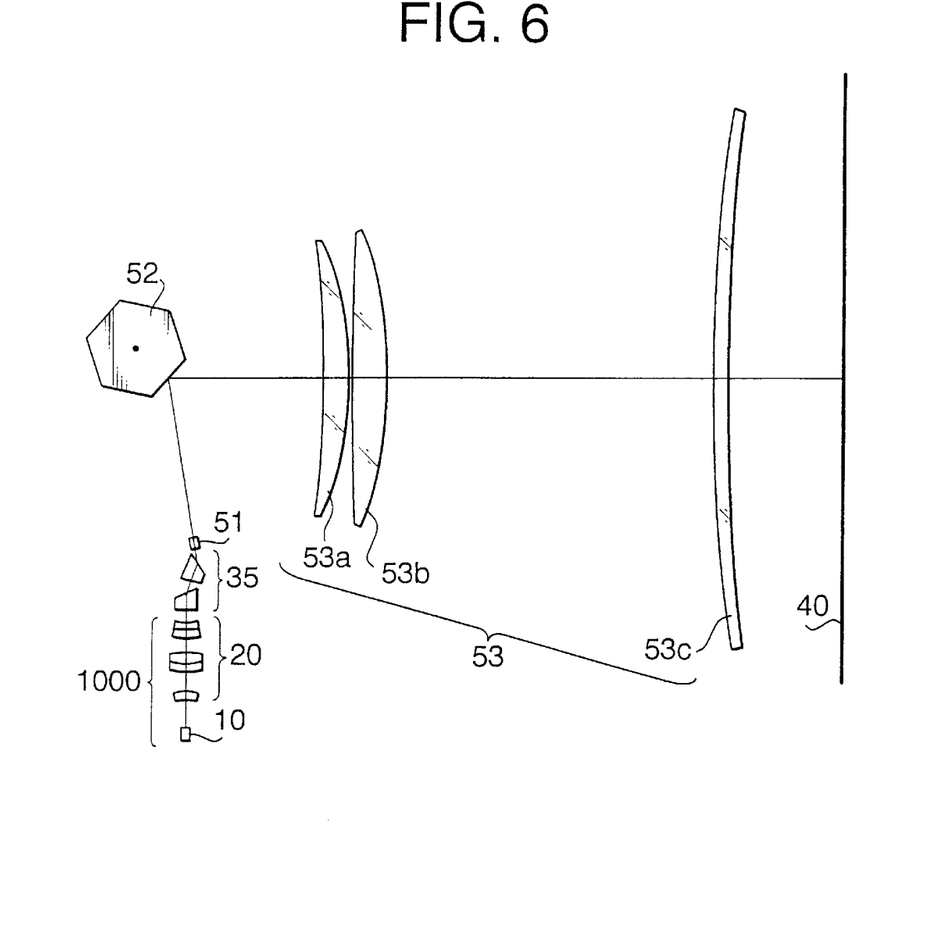
FIG. 6 shows a scanning optical system according to a second embodiment of the invention.

FIG. 6 shows a scanning optical system according to a second embodiment of the invention which satisfies the condition (1) described above, and FIG. 7 is an enlarged view of a light source portion of the scanning optical system shown in FIG. 6. The scanning optical system shown in FIGS. 6 and 7 includes a beam shaping optical system 35 instead of the beam shaping optical system 30 of the first embodiment. The other elements, i.e., the multi-beam laser diode 10, the collimating lens 20, the converging optical system 50 having the cylindrical lens 51, the polygon mirror 52 and the fθ lens 53 are similar to those employed in the first embodiment.

TABLE 6 indicates the numerical structure of the beam shaping optical system 35 including a first prism 36 and a second prism 37. The first prism 36 having a tenth surface S10 and an eleventh surface S11, and the second prism 37 has a twelfth surface 812 and a thirteenth surface S13. Similar to the first embodiment, since each surface of the prisms 36 and 37 is flat, a value of the radius "r" therefor is ∞ in the table. A character α represents an angle between adjacent two surfaces of the prism. When the sign of the angle α is positive, the angle is measured in the clockwise direction, and if negative, in the counterclockwise direction. The distance "d" is a length of the reference ray between the adjacent two surfaces. In particular, "d9" is a distance between the last surface (i.e., the ninth surface S9) of the collimating lens 20 and the light source side surface (i.e., the tenth surface S10) of the first prism 36.

TABLE 6 d9 = 5.000 mm

| surface # | r | d | n | α |
|---|---|---|---|---|
| 10 | ∞ | 6.000 | 1.89665 | −22.425 |
| 11 | ∞ | 5.000 | | 34.888 |
| 12 | ∞ | 6.000 | 1.51072 | 44.391 |
| 13 | ∞ | | | |

The beam shaping optical system 35 is arranged such that the reference ray is incident on the first surface of the first prism 36 at a right angle. In the second embodiment, a difference of the emission angles |θ8−θ'8| becomes maximum, within a range of −10°≦V≦+10°, when the angle V equal ±10°, where V is an angle formed between the reference ray and the skew ray in a plane perpendicular to the principal section.

For a skew ray inclined by 10° with respect to the reference ray in a plane perpendicular to the principal section, the refractive index n10=1.89665 of the first prism 36 is changed to an apparent index ns10=1.917820, and the refractive index n12=1.51072 of the second prism 37 is changed to an apparent index ns12=1.523858. The angles θ1 through θ8 for the reference ray and the skew ray in this condition are indicated in TABLE 7. In this case, the difference of the emission angles |θ8−θ'8|=0.0075°. Thus, condition (1) described above is satisfied.

It should be noted that, a magnification Mv of the beam shaping optical system 35 with respect to the reference ray in a plane perpendicular to the principal section is 1.00, while a magnification Mh in a plane parallel with the principal section is less than 1 (one), and the beam is reduced within this plane. It is preferable that an anamorphic ratio MVP/Mh satisfies the following condition (3)

$$1.00 < Mv/Mh < 3.00 \quad (3).$$

In the beam shaping optical system 35, Mh equal 0.4, and accordingly the anamorphic ration Mv/Mh=2.5, which satisfies the condition (3).

TABLE 7

| angle | reference ray | skew ray |
|---|---|---|
| θ1 | 0.0000 | 0.0000 |
| θ2 | 0.0000 | 0.0000 |
| θ3 | 22.4250 | 22.4250 |
| θ4 | 46.3460 | 47.0205 |
| θ5 | 11.4580 | 12.1325 |
| θ6 | 7.5559 | 7.9276 |
| θ7 | −36.8351 | −36.4634 |
| θ8 | −64.9174 | −64.9099 |

Figure 8A:
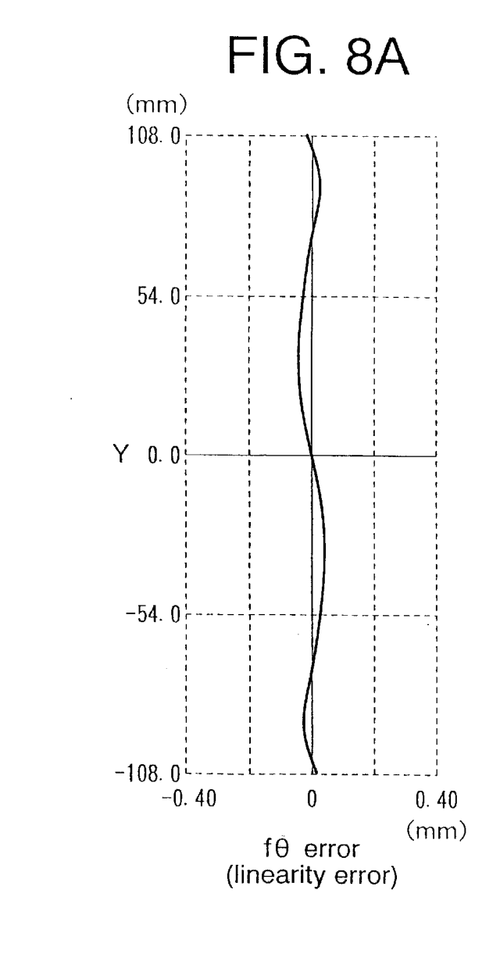
FIG. 8A shows a linearity error.
Figure 8B:
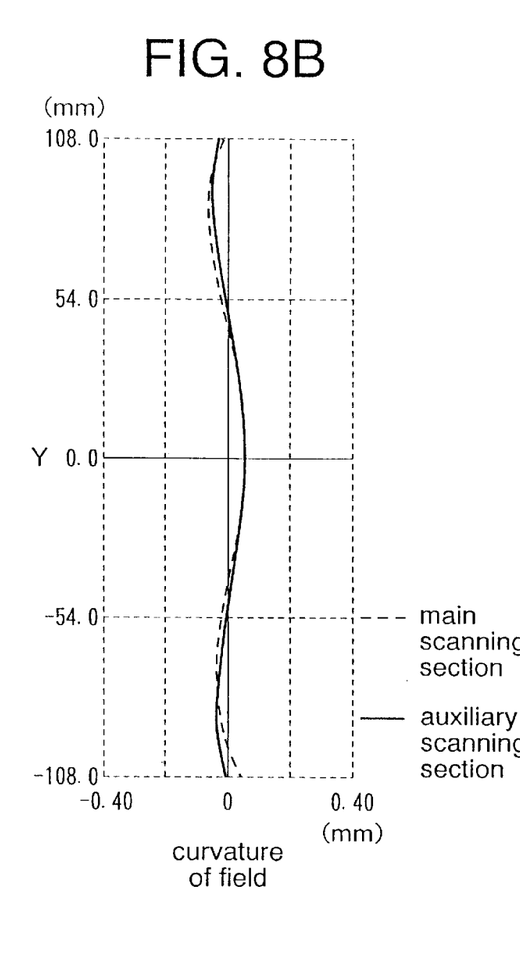
FIG. 8B shows a curvature of field.
Figure 8C:
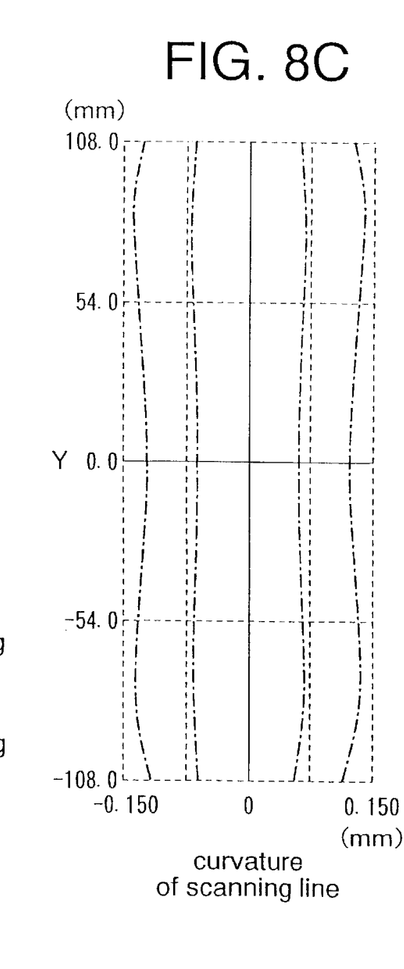
FIG. 8C shows a curvature of a scanning line.

FIGS. 8A–8C show graphs of the scanning optical system according to the second embodiment, where FIG. 8A shows a linearity error, FIG. 8B shows a curvature of field (broken line: main scanning direction; solid line: auxiliary scanning direction), and FIG. 8C shows a curvature, in the auxiliary scanning direction, of a scanning line. In each graph, a vertical axis represents an image height Y (i.e., a coordinate in the main scanning direction with respect to an origin at which the optical axis of the fθ lens 53 intersects the surface 40), and a horizontal axis represents amount of each aberration. Unit of measurement is mm (millimeter).

TABLE 8 indicates a positoinal relationship between spots which are formed on the surface 40. In TABLE 8, ΔZ0 represents a coordinate of light emitting point on the multi-beam laser diode 10, with respect to the third beam emitting point from which the reference ray is emitted. ΔZ1 represents a coordinate, in the auxiliary scanning direction, of a center of each spot formed on the surface 40 with respect to the point where the reference ray intersects the surface 40. ΔY1 represents position, in the main scanning direction, of the center of each spot on the surface 40 with respect to a position where the reference ray intersects the surface 40. Unit of measurement for ΔZ0, ΔZ1, and ΔY1 is μm (micrometer).

TABLE 8

|  | ΔZ0 | ΔZ1 | ΔY1 |
|---|---|---|---|
| 1st emitting point | 100 | 123 | 0 |
| 2nd emitting point | 50 | 61 | 0 |
| 3rd emitting point | 0 | 0 | 0 |
| 4th emitting point | −50 | −61 | 0 |
| 5th emitting point | −100 | −123 | 0 |

As mentioned above, in the first embodiment, incidence rays onto the beam shaping optical system 30 are parallel with the rays emerging from the beam shaping optical system 30. However, in the main scanning direction, positions of the spots slightly varies. According to the second embodiment, as indicated in TABLE 8, the positions of the spots on the surface 40 in the main scanning direction can be aligned on one line.

Figure 7:
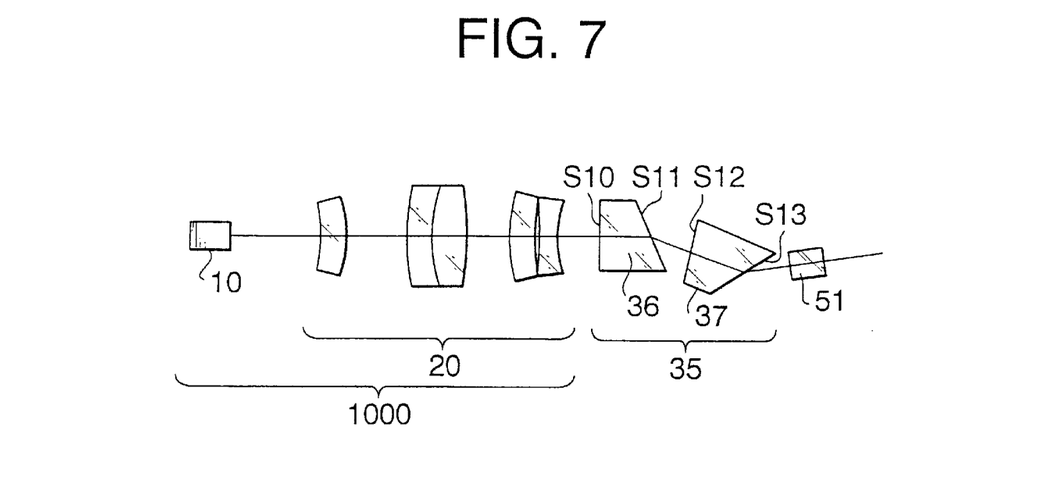
FIG. 7 is an enlarged view of a light source portion of the scanning optical system shown in FIG. 6.

TABLE 9 indicates a third embodiment which a modified numerical structure of the beam shaping optical system 35 shown in FIGS. 6 and 7. The third embodiment also satisfies the condition (1) described above. Further, in the third embodiment, the magnification Mh equal 0.4, and accordingly the anarmophic ratio Mv/Mh=2.5, which satisfies the condition (3).

In the table, "r" is a radius of a curvature, the character α represents an angle between adjacent two surfaces of the prism. The distance "d" is a length of the reference ray between the adjacent two surfaces.

TABLE 9

| surface # | r | d | n | α |
|---|---|---|---|---|
| 10 | ∞ | 6.000 | 1.89665 | −22.262 |
| 11 | ∞ | 5.000 |  | 23.503 |
| 12 | ∞ | 6.000 | 1.51072 | 55.517 |
| 13 | ∞ |  |  |  |

In the third embodiment, the beam shaping optical system 35 is arranged such that the reference ray is incident on the first face of the first prism 36 at a right angle. In the third embodiment, a difference of the emission angels |θ8−θ'8| becomes maximum, within a range of −10°≦V≦10°, when the angle V equal ±7°, where V is an angle formed between the reference ray and the skew ray in a plane perpendicular to the principal section.

For a skew ray inclined by 7° with respect to the reference ray in the plane perpendicular to the principal section, the refractive index n10=1.89665 of the first prism 36 is changed to an apparent index ns10=1.906495, and the refractive index n12=1.51072 of the second prism 37 is changed to an apparent index ns12=1.517105. The angles θ1 through θ8 for the reference ray and the skew ray in this condition are indicated in TABLE 10. In this case, the difference of the emission angels |θ8−θ'8|=0.0026°. Thus, condition (1) is satisfied.

TABLE 10

| angle | reference ray | skew ray |
|---|---|---|
| θ1 | 0.0000 | 0.0000 |
| θ2 | 0.0000 | 0.0000 |
| θ3 | 25.2620 | 25.2620 |
| θ4 | 54.0384 | 54.4693 |
| θ5 | 30.5354 | 30.9663 |
| θ6 | 19.6522 | 19.8254 |
| θ7 | −35.8648 | −35.6916 |
| θ8 | −62.2628 | −62.2654 |

TABLE 11 indicates a fourth embodiment which is another modified numerical structure of the beam shaping optical system 35 shown in FIGS. 6 and 7. The fourth embodiment also satisfies the condition (1) described above. Further, in the fourth embodiment, the magnification Mh equal 0.6666, and accordingly the anarmophic ratio Mv/Mh=1.5, which satisfies the condition (3).

In the table, "r" is a radius of a curvature, the character a represents an angle between adjacent two surfaces of the prism. The distance "d" is a length of the reference ray between the adjacent two surfaces.

TABLE 11

| surface # | r | d | n | α |
|---|---|---|---|---|
| 10 | ∞ | 6.000 | 1.89665 | −22.564 |
| 11 | ∞ | 5.000 | | 17.483 |
| 12 | ∞ | 6.000 | 1.51072 | 45.202 |
| 13 | ∞ | | | |

In the fourth embodiment, the beam shaping optical system 35 is arranged such that the reference ray is incident on the first face of the first prism 36 at a right angle. In the third embodiment, a difference of the emission angles |θ8−θ'8| becomes maximum, within a range of −10°≤V≤+10°, when the angle V equal ±10°, where V is an angle formed between the reference ray and the skew ray in a plane perpendicular to the principal section. For a skew ray inclined by 10° with respect to the reference ray in a plane perpendicular to the principal section, the refractive index n10=1.89665 of the first prism 36 is changed to an apparent index ns10=1.917820, and the refractive index n12=1.51072 of the second prism 37 is changed to an apparent index ns12=1.523858. The angles θ1 through θ8 for the reference ray and the skew ray in this condition are indicated in TABLE 10. In this case, the difference of the emission angels |θ8−θ'8|=0.0017°. Thus, condition (1) is satisfied.

TABLE 12

| angle | reference ray | skew ray |
|---|---|---|
| θ1 | 0.0000 | 0.0000 |
| θ2 | 0.0000 | 0.0000 |
| θ3 | 22.5640 | 22.5640 |
| θ4 | 46.7001 | 47.3830 |
| θ5 | 29.2171 | 29.9000 |
| θ6 | 18.8507 | 19.0942 |
| θ7 | −26.3513 | −26.1078 |
| θ8 | −42.1109 | −42.1127 |

TABLE 13 indicates a comparison example which has a similar structure of the beam shaping optical system 35 shown in FIGS. 6 and 7 but is designed for shaping a single beam.

In the table "r" is a radius of a curvature, the character α represents an angle between adjacent two surfaces of the prism. The distance "d" is a length of the reference ray between the adjacent two surfaces.

TABLE 13

| surface # | r | d | n | α |
|---|---|---|---|---|
| 10 | ∞ | 4.000 | 1.51072 | −34.374 |
| 11 | ∞ | 6.000 | | 58.533 |
| 12 | ∞ | 4.000 | 1.51072 | 34.374 |
| 13 | ∞ | | | |

Similar to the above-described embodiments, the beam shaping optical system is arranged such that the reference ray is incident on the first face of the first prism at a right angle. In the comparison example, a difference of the emission angels |θ8−θ'8| becomes maximum, within a range of −10°≤V≤+10°, when the angle V equal ±10°, where V is an angle formed between the reference ray and the skew ray in a plane perpendicular to the principal section.

For a skew ray inclined by 10° with respect to the reference ray in the plane perpendicular to the principal section, the refractive indexes n10 and n12 is changed to an apparent refractive index 1.523858. The angles θ1 through θ8 for the reference ray and the skew ray in this condition are indicated in TABLE 15. In this case, the difference of the emission angels |θ8−θ'8|=0.489220 . Thus, condition (1) is not satisfied.

TABLE 15

| angle | reference ray | skew ray |
|---|---|---|
| θ1 | 0.0000 | 0.0000 |
| θ2 | 0.0000 | 0.0000 |
| θ3 | 34.3740 | 34.3740 |
| θ4 | 58.5330 | 59.3569 |
| θ5 | 0.0000 | 0.8239 |
| θ6 | 0.0000 | 0.5406 |
| θ7 | −34.6740 | −33.8334 |
| θ8 | −58.5330 | −58.0437 |

Figure 9:
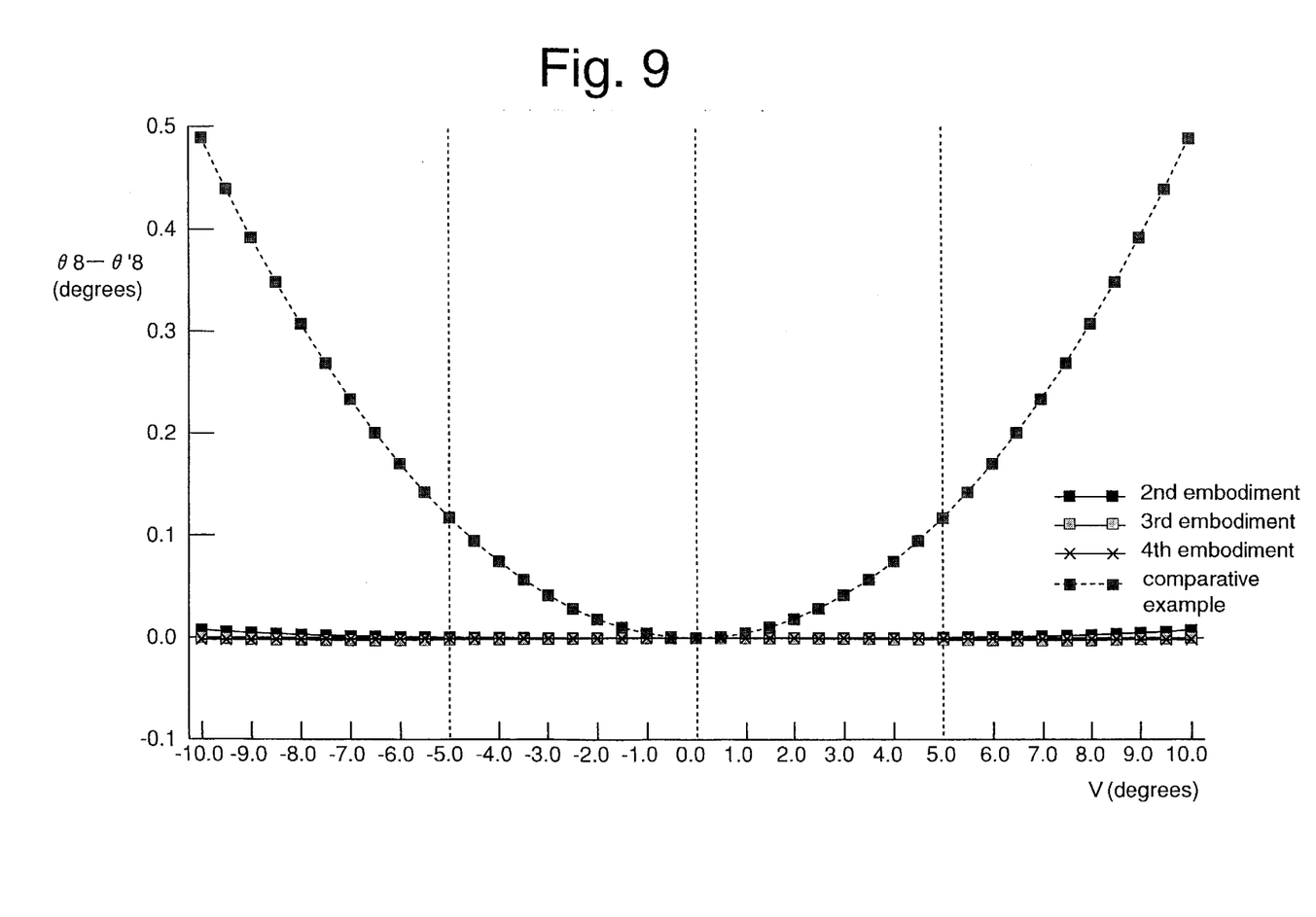
FIG. 9 is a graph showing the relationship between an emission angle and an inclination of skew ray.

Table 16 indicates a relationship between the angle V and the difference θ8−θ'8 within a range of −10°≤V≤+10° for the second, third, fourth embodiments and the comparative example. FIG. 9 is a graph showing the relationship indicated in TABLE 16. In the comparative example, which is designed not for the multi-beam laser diode, the error of the emission angle increase like a quadratic function. On the other hand, in the embodiments, the error is significantly small.

TABLE 16

| v | 2nd embodiment Δθ | 3rd embodiment Δθ | 4th embodiment Δθ | comparative embodiment Δ74 |
|---|---|---|---|---|
| −10.000 | 0.0075 | 0.0000 | −0.0017 | 0.4892 |
| −9.500 | 0.0060 | −0.0009 | −0.0017 | 0.4394 |
| −9.000 | 0.0048 | −0.0016 | −0.0017 | 0.3925 |
| −8.500 | 0.0038 | −0.0021 | −0.0016 | 0.3486 |
| −8.000 | 0.0029 | −0.0024 | −0.0016 | 0.3075 |
| −7.500 | 0.0022 | −0.0025 | −0.0015 | 0.2693 |
| −7.000 | 0.0017 | −0.0026 | −0.0014 | 0.2337 |
| −6.500 | 0.0012 | −0.0025 | −0.0012 | 0.2008 |
| −6.000 | 0.0009 | −0.0023 | −0.0011 | 0.1706 |
| −5.500 | 0.0006 | −0.0021 | −0.0010 | 0.1429 |
| −5.000 | 0.0004 | −0.0019 | −0.0008 | 0.1178 |
| −4.500 | 0.0002 | −0.0016 | −0.0007 | 0.0952 |
| −4.000 | 0.0001 | −0.0014 | −0.0006 | 0.0751 |
| −3.500 | 0.0001 | −0.0011 | −0.0004 | 0.0574 |
| −3.000 | 0.0000 | −0.0008 | −0.0003 | 0.0421 |
| −2.500 | 0.0000 | −0.0006 | −0.0002 | 0.0292 |
| −2.000 | 0.0000 | −0.0004 | −0.0001 | 0.0187 |
| −1.500 | 0.0000 | −0.0002 | −0.0001 | 0.0105 |
| −1.000 | 0.0000 | −0.0001 | 0.0000 | 0.0047 |
| −0.500 | 0.0000 | 0.0000 | 0.0000 | 0.0012 |
| 0.000 | 0.0000 | 0.0000 | 0.0000 | 0.0000 |
| 0.500 | 0.0000 | 0.0000 | 0.0000 | 0.0012 |
| 1.000 | 0.0000 | −0.0001 | 0.0000 | 0.0047 |
| 1.500 | 0.0000 | −0.0002 | −0.0001 | 0.0105 |
| 2.000 | 0.0000 | −0.0004 | −0.0001 | 0.0187 |
| 2.500 | 0.0000 | −0.0006 | −0.0002 | 0.0292 |
| 3.000 | 0.0000 | −0.0008 | −0.0003 | 0.0421 |
| 3.500 | 0.0001 | −0.0011 | −0.0004 | 0.0574 |
| 4.000 | 0.0001 | −0.0014 | −0.0006 | 0.0751 |
| 4.500 | 0.0002 | −0.0016 | −0.0007 | 0.0952 |
| 5.000 | 0.0004 | −0.0019 | −0.0008 | 0.1178 |
| 5.500 | 0.0006 | −0.0021 | −0.0010 | 0.1429 |
| 6.000 | 0.0009 | −0.0023 | −0.0011 | 0.1706 |
| 6.500 | 0.0012 | −0.0025 | −0.0012 | 0.2008 |
| 7.000 | 0.0017 | −0.0026 | −0.0014 | 0.2337 |
| 7.500 | 0.0022 | −0.0025 | −0.0015 | 0.2693 |
| 8.000 | 0.0029 | −0.0024 | −0.0016 | 0.3075 |
| 8.500 | 0.0038 | −0.0021 | −0.0016 | 0.3486 |
| 9.000 | 0.0048 | −0.0016 | −0.0017 | 0.3925 |
| 9.500 | 0.0060 | −0.0009 | −0.0017 | 0.4394 |
| 10.000 | 0.0075 | 0.0000 | −0.0017 | 0.4892 |

Figure 10:
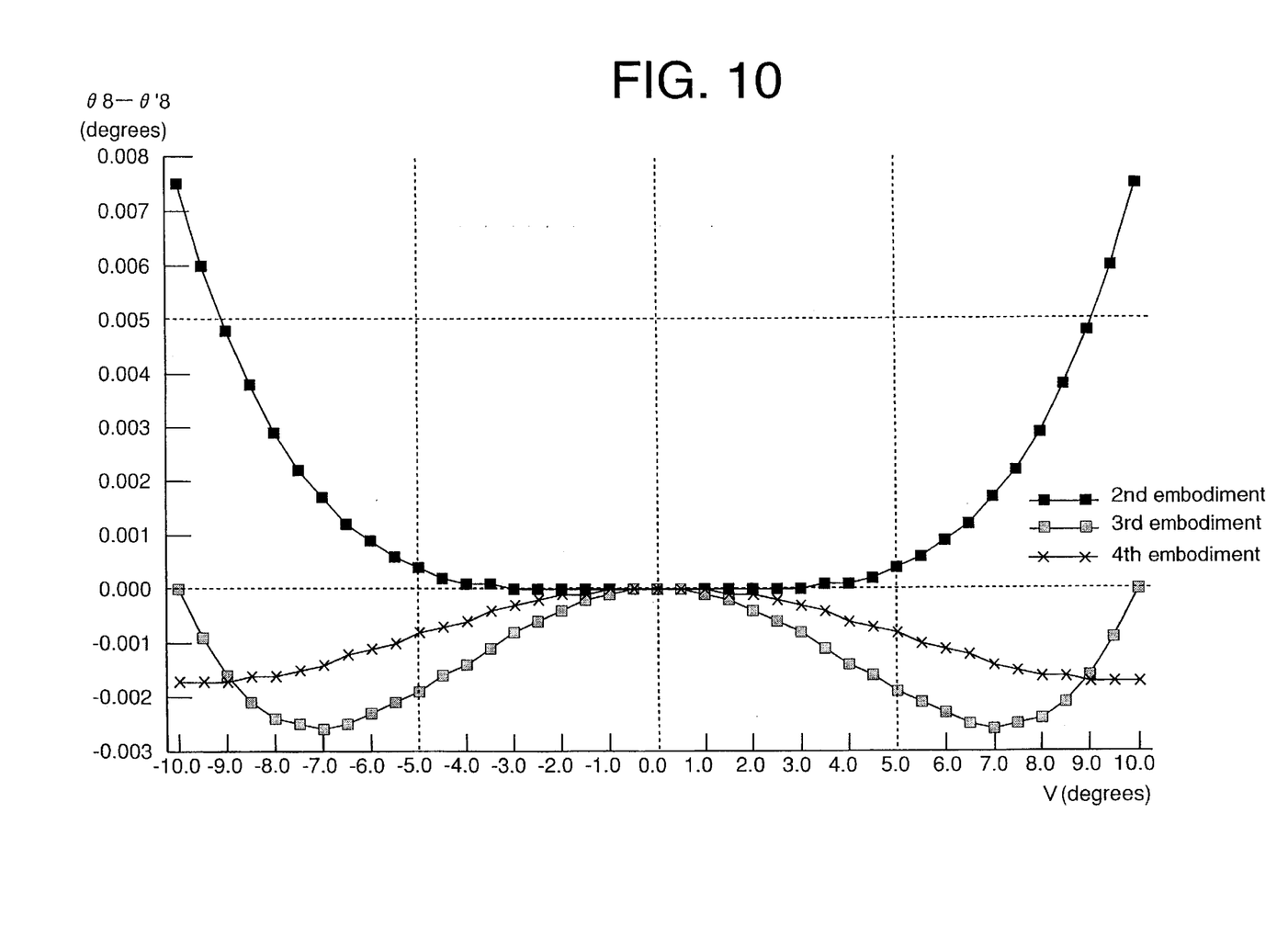
FIG. 10 is a graph which is similar to the graph shown in FIG. 9 but scale of the vertical axis is expanded by 60 times.

FIG. 10 is a graph which is similar to the graph shown in FIG. 9 but scale of the vertical axis is expanded by 60 times.

As shown in FIG. 10, in the second embodiment, the error of emission angle varies in the quadratic-function like manner. In the third and fourth embodiments, the error of the emission angle varies in a fourth-order function like manner. It should be noted, however, that in either embodiment, the quantity of error of the emission angel is suppressed to a sufficiently small level.

As described above, according to the embodiments of the present invention, there is provided a scanning optical device employing a beam shaping optical system with which elliptical-shaped light beams emitted from light emitting points aligned at predetermined intervals are converted to circular-shaped light beams, and the beam spots formed on the surface to be scanned are remained at regular intervals.

The present disclosure relates to subject matters contained in Japanese Patent Applications No. HEI 09-14484, and HEI 09-14485, both filed on Jan. 10, 1997, which are expressly incorporated herein by reference in their entireties.

What is claimed is:

1. A beam shaping optical system, comprising a first and a second wedge prism, principal sections of said first and second wedge prisms being parallel with each other, wherein when a reference ray is incident on said first wedge prism and a skew ray, which has a same incident angle as said reference ray if projected on said principal section and inclined by an angle V with respect to said reference ray in a plane perpendicular to said principal section, a condition:

$$|\theta 8 - \theta' 8| < 0.100°$$

is satisfied,
where, $\theta 8$ is an emission angle of said reference ray emitted from said second wedge prism in said principal section, and $\theta' 8$ is an emission angle of said skew ray emitted from said second wedge prism projected on said principal section, and $|V| < 10°$.

2. The beam shaping optical system according to claim 1, wherein an incident angle of said reference ray onto said first prism is zero degree.

3. The beam shaping optical system according to claim 1, wherein an anamorphic ratio Mv/Mh satisfies a condition:

$$1.00 < Mv/Mh < 3.00$$

where, Mv is a magnification of said beam shaping optical system within a plane perpendicular to said principal section, and Mh is a magnification of said beam shaping optical system in a plane perpendicular to said principal section.

* * * * *